US007656601B1

(12) United States Patent
Li (10) Patent No.: US 7,656,601 B1
(45) Date of Patent: Feb. 2, 2010

(54) CURRENT BIASING CIRCUIT TO REDUCE MR COMMON MODE VOLTAGE JUMPING FOR MR RESISTANCE MEASUREMENT

(75) Inventor: Kan Li, Singapore (SG)

(73) Assignee: Marvell International Ltd., Hamilton (BM)

( * ) Notice: Subject to any disclaimer, the term of this patent is extended or adjusted under 35 U.S.C. 154(b) by 287 days.

(21) Appl. No.: 11/975,568

(22) Filed: Oct. 19, 2007

Related U.S. Application Data (60) Provisional application No. 60/863,647, filed on Oct. 31, 2006.

(51) Int. Cl.
*G11B 5/03* (2006.01)
(52) U.S. Cl. .................................................. 360/66
(58) Field of Classification Search .................. 360/66, 360/31, 46, 67
See application file for complete search history.

(56) References Cited

U.S. PATENT DOCUMENTS

| | | | | |
|---|---|---|---|---|
| 4,853,633 A * | 8/1989 | Matsumoto | ................. | 324/210 |
| 5,313,342 A * | 5/1994 | Soda et al. | ..................... | 360/63 |
| 5,534,818 A * | 7/1996 | Peterson | ..................... | 327/545 |
| 5,712,739 A * | 1/1998 | Nakamura et al. | ............ | 360/46 |
| 5,856,891 A | 1/1999 | Ngo | ............................. | 360/66 |
| 5,886,568 A | 3/1999 | Ngo et al. | .................... | 357/538 |
| 5,986,839 A * | 11/1999 | Klaassen et al. | ............. | 360/66 |
| 6,023,395 A * | 2/2000 | Dill et al. | ................. | 360/324.2 |
| 6,101,056 A * | 8/2000 | Klaassen et al. | .............. | 360/66 |
| 6,128,149 A | 10/2000 | Li | ................................ | 360/66 |
| 6,225,802 B1 * | 5/2001 | Ramalho et al. | ............ | 324/252 |
| 6,404,579 B1 * | 6/2002 | Ranmuthu et al. | ............ | 360/66 |
| 6,490,112 B1 | 12/2002 | Ranmuthu et al. | ............ | 360/66 |
| 7,027,271 B2 * | 4/2006 | Inage et al. | ................. | 360/322 |
| 2002/0036874 A1 * | 3/2002 | Inage et al. | ................. | 360/322 |
| 2006/0152838 A1 * | 7/2006 | Fitzgerald et al. | ............. | 360/46 |
| 2007/0070536 A1 | 3/2007 | Christianson et al. | ......... | 360/46 |
| 2008/0062551 A1 * | 3/2008 | Dolan et al. | .................. | 360/31 |

OTHER PUBLICATIONS

K. Jensen, "Cause and Effects of Common-Mode Leakthrough", Quantum Design, Technical Bulletin. (copy right, 1999).
"Common-Mode Noise: Sources and Solutions", Agilent Technologies, Application Note 1043, 1999.

\* cited by examiner

*Primary Examiner*—Fred Tzeng (57) ABSTRACT

A circuit for measuring resistance of a magnetoresistive head. First and second current biasing circuits are respectively coupled to opposite sides of the head. The first biasing circuit includes a first resistance, and the second biasing circuit includes a second resistance. First and second current mirrors are respectively coupled to the first and second biasing circuits. A current leg is coupled to the current mirrors. The current mirrors drive current in the resistances so that a first voltage across the first resistance is substantially equal and opposite to a second voltage across the second resistance. The biasing circuits bias current through the head such that a voltage on the first side of the head is close to the first voltage and a voltage on the second side of the head is close to the second voltage, so that the common mode voltage of the head will be close to zero.

11 Claims, 5 Drawing Sheets

FIG. 1
(PRIOR ART)

Rmr=VMR/IC

CURRENT BIASING CIRCUIT TO REDUCE MR COMMON MODE VOLTAGE JUMPING FOR MR RESISTANCE MEASUREMENT

CROSS-REFERENCE TO RELATED APPLICATION

This application claims the benefit of U.S. Provisional Patent Application No. 60/863,647, filed Oct. 31, 2006, the contents of which are hereby incorporated by reference as if fully stated herein.

FIELD

Example aspects of the present invention generally relate to a current biasing circuit to reduce common mode voltage jumping in magnetoresistive (MR) resistance measurements.

BACKGROUND

The electronic storage of data is essential to the management of computer and information systems. Currently, one popular method of electronic storage utilizes magnetoresistive (MR) heads to store and recover data on a disk.

To recover data from a disk, an MR head employs an MR element which changes in resistance according to information stored on an adjacent disk surface. In particular, information is stored on the disk surface as small magnetic domains which produce a series of small localized magnetic fields, and the MR head changes in resistance in accordance with the changing magnetic flux. A current is passed through the MR head, and magnetic information stored on the disk is "read" by measuring the changes in the resistance of the MR head as it passes through the magnetic fields. Specifically, using the value of the current, and by measuring the voltage induced thereby across the MR head, the change in resistance can be calculated. Typically, the voltage across the MR head is measured by converting it to a digital signal using an analog-to-digital (ADC) converter.

Figure 1:
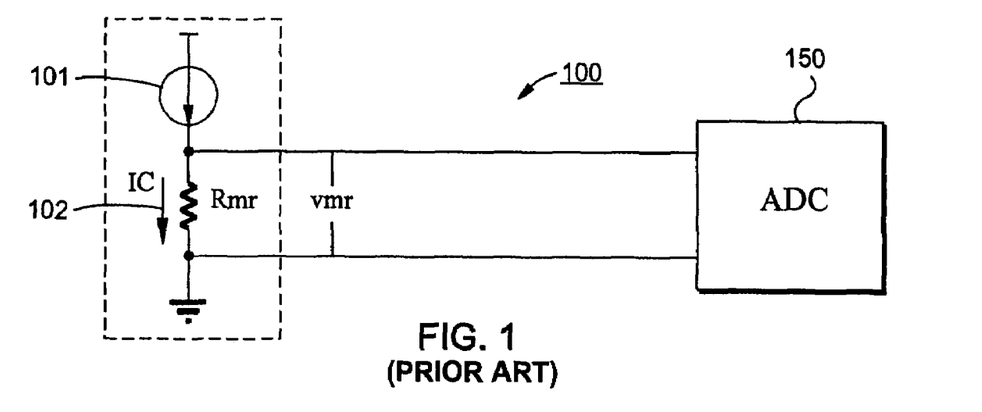
FIG. 1 is a schematic view of a conventional MR resistance measuring circuit.

FIG. 1 depicts a schematic view of a conventional MR resistance measuring circuit 100. In FIG. 1, ADC 150 is an analog-to-digital converter for converting an analog signal to a digital signal. As can be seen, ADC 150 connects to each side of the magnetoresistive head (hereafter "MR head") 102, for measuring the voltage vmr across MR head 102. Current source 101 provides a current which is passed through the MR head 102, and which is used in combination with the changes in the voltage across MR head 102 to calculate the resistance Rmr of the MR head.

However, MR heads are sensitive to disturbances introduced into the circuit. One typical disturbance is a common-mode voltage. Fluctuations in common-mode voltage can be caused by numerous sources, including nearby magnetic fields, manufacturing processes, circuit topology, and parasitic circuit elements.

Big fluctuations in common mode voltage, and other jumps in such common mode voltage, may cause damage to the MR head.

While some sources of common-mode disturbances can be detected and addressed, it is difficult to identify and eliminate all causes of common-mode disturbances. Moreover, while some computer chips may be able to tolerate higher amounts of common-mode voltage, other circuits may not be able to function properly once common-mode voltage reaches a threshold level.

SUMMARY

Example embodiments of the present invention address the foregoing by providing a current biasing circuit to reduce MR common mode voltage jumping for MR resistance measurements.

Thus, in one example aspect, the resistance of a magnetoresistive head coupled to a current source is measured. First and second current biasing circuits are respectively coupled to opposite sides of the magnetoresistive head for biasing current through the magnetoresistive head. The first current biasing circuit includes a first resistance, and the second current biasing circuit includes a second resistance. The first and second resistances have values substantially identical to each other and are both coupled to ground. First and second current mirrors are respectively coupled to the first and second current biasing circuits. A current leg is coupled to the current mirrors. The current mirrors drive current in the resistances so that a first voltage across the first resistance is substantially equal and opposite to a second voltage across the second resistance. The biasing circuits bias current through the magnetoresistive head such that a voltage on the first side of the magnetoresistive head is substantially close to the first voltage and a voltage on the second side of the magnetoresistive head is substantially close to the second voltage.

Since the voltages on opposite sides of the MR head are substantially equal and opposite, one source of common-mode voltage "jumping" is reduced significantly.

In another example aspect, the resistance of a magnetoresistive head is measured. First and second current biasing means are respectively coupled to first and second opposite sides of the magnetoresistive head for biasing current through the magnetoresistive head. The first current biasing means include a first resistance, and the second current biasing means include a second resistance. The first and second resistances have values substantially identical to each other and are both coupled to ground. First and second current mirroring means are respectively coupled to the first and second current biasing means, and a current transfer means is coupled to the first and second current mirroring means. The current mirroring means drive current in the first and second resistances so that a first voltage across the first resistance is substantially equal and opposite to a second voltage across the second resistance. The first and second current biasing means bias current through the magnetoresistive head such that a voltage on the first side of the magnetoresistive head is substantially close to the first voltage and such that a voltage on the second side of the magnetoresistive head is substantially close to the second voltage.

This brief summary has been provided so that the nature of example aspects of the present invention may be understood quickly. A more complete understanding of example aspects of the invention can be obtained by reference to the following detailed description of the preferred example embodiments thereof in connection with the attached drawings.

DETAILED DESCRIPTION

Figure 2:
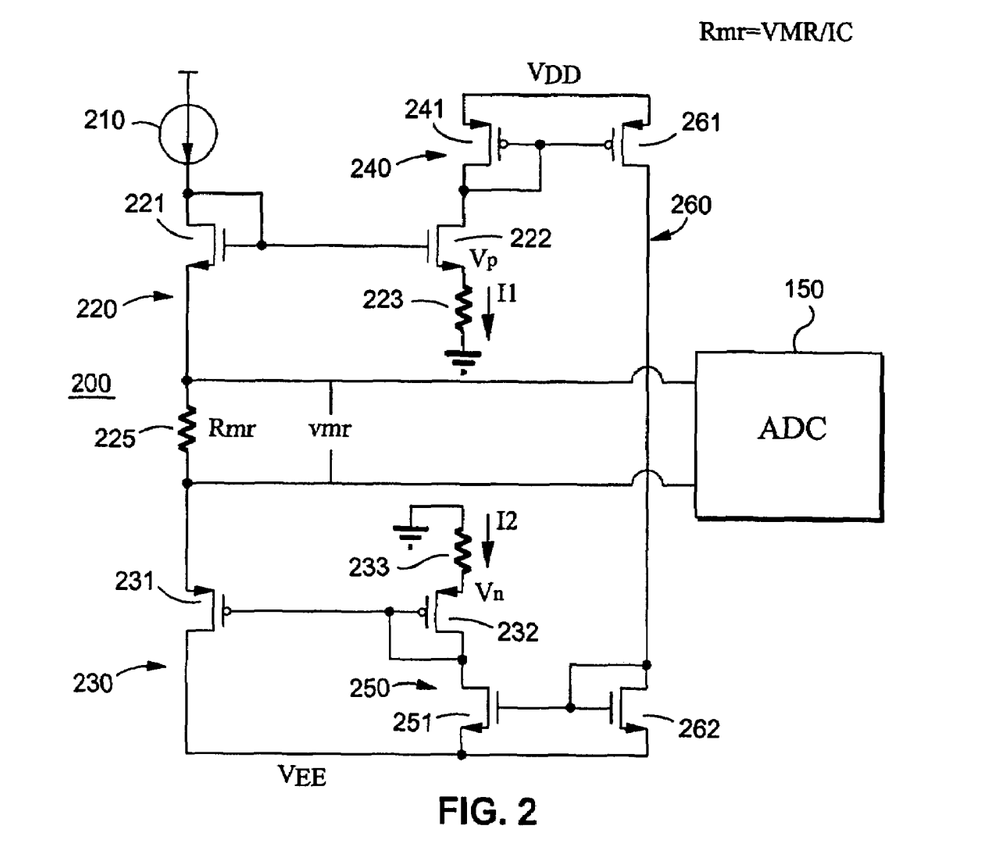
FIG. 2 is a detailed schematic view for explaining an example structure of a CM jump reduction circuit.

Example aspects of the present invention will now be explained with reference to FIG. 2. FIG. 2 depicts a schematic view of an example of a common-mode ("CM") jump reduction circuit 200.

As can be seen from FIG. 2, CM jump reduction circuit 200 is coupled to a current source 210. Current source 210 provides a current through the MR head 225.

For purposes of simplicity, MR head 225 is depicted as a single resistor (to represent the resistance of the MR head), but it should be understood that MR head 225 can include multiple components and/or multiple resistors.

Analog-to-digital converter (ADC) 150 is coupled across MR head 225. ADC 150 is used to convert analog voltage signals obtained from measuring the voltage vmr of MR head 225. From the voltage vmr, and from the knowledge of the current produced by current source 210, the resistance Rmr of MR head 225 can be calculated.

CM Jump reduction circuit 200 includes first and second biasing circuits 220 and 230, first and second current mirrors 240 and 250, and current leg 260.

Biasing circuit 220 is coupled to one side of MR head 225, and is used for biasing current through MR head 225. In particular, biasing circuit 220 is used to drive the voltage on its side of MR head 225 close to the voltage across resistor 223. This process will be explained in more detail below. Biasing circuit 220 includes NMOS transistor 221, NMOS transistor 222, and resistor 223.

As can be seen from FIG. 2, biasing circuit 220 is coupled such that the current source 210 connects to the respective gates of NMOS transistor 221 and NMOS transistor 222. Current source 210 is also coupled to the drain of NMOS transistor 221. The source of NMOS transistor 221 is coupled to one side of MR head 225. The source of NMOS transistor 222 is coupled to resistor 223, and the other side of resistor 223 is coupled to ground. The drain of NMOS transistor 222 is coupled to the gate of current mirror 240 and to the gate of PMOS transistor 261.

Biasing circuit 230 is coupled to the opposite side of MR head 225 (i.e., the side of MR head 225 opposite that of biasing circuit 220). Biasing circuit 230 is also used for biasing current through MR head 225. In particular, biasing circuit 230 is used to drive the voltage on its side of MR head 225 close to the voltage across resistor 233. This process will be explained in more detail below. Biasing circuit 230 includes PMOS transistor 231, PMOS transistor 232, and resistor 233.

The source of PMOS transistor 231 is coupled to one side of MR head 225. The drain of PMOS transistor 231 is coupled to the source of current mirror 250 and to the source of NMOS transistor 262. Additionally, the gate of PMOS transistor 231 is coupled to the drain of current mirror 250. The source of PMOS transistor 232 is coupled to resistor 233, and the other side of resistor 233 is coupled to ground. The gate and drain of PMOS transistor 232 are both coupled to the drain of current mirror 250.

In biasing circuit 220, the sizes of NMOS transistor 221 and NMOS transistor 222 should be relatively large, so that there is not a large drop in current from current source 210 over biasing circuit 220. Similarly, in biasing circuit 230, the sizes of PMOS transistor 231 and PMOS transistor 232 should be relatively large, so that there is not a large drop in current over biasing circuit 230.

Moreover, the values of the resistor 223 in biasing circuit 220 and resistor 233 in biasing circuit 230 should be substantially identical. In other words, resistor 223 should have a resistance that is substantially equal to that of resistance 233. The importance of this configuration will become apparent in the discussion below.

As discussed above, biasing circuit 220 is coupled to current mirror 240. Current mirror 240 includes PMOS transistor 241, and is used for mirroring current I1. In particular, current mirror 240 is used to drive the current in resistor 223 to that of the current in current leg 260. Both the drain and the gate of PMOS transistor 241 are coupled to the drain of NMOS transistor 222 in biasing circuit 220. The source of PMOS transistor 240 is coupled to the source of PMOS transistor 261, which is part of current leg 260.

On the other side of MR head 225, biasing circuit 230 is coupled to current mirror 250. Current mirror 250 includes NMOS transistor 251, and is used for mirroring current in current leg 260. In particular, current mirror 250 is used to drive the current in resistor 233 to that of the current in current leg 260. The source of NMOS transistor 250 is coupled to the drain of PMOS transistor 231 of biasing circuit 230, as well as the source of NMOS transistor 262 of current leg 260. The gate of NMOS transistor 250 is coupled to current leg 260, and in particular to the drains of NMOS transistor 262 and PMOS transistor 261.

Thus, the current mirror 240 and current mirror 250 can mirror the current I1 to current leg 260, which comprises PMOS transistor 261 and NMOS transistor 262, then to I2, such that the current traveling in current leg 260 is also traveling down the respective legs of current mirror 240 and current mirror 250. In other words, the current traveling from current mirror 240 to biasing circuit 220, and in particular resistor 223, is driven to the same value as the current in current leg 260. Similarly, the current traveling from current mirror 250 to biasing circuit 230, and in particular resistor 233, is driven to the same value as the current in current leg 260.

The operation of CM jump reduction circuit 200 will now be described. In operation, current leg 260 regulates the current which it receives from current biasing circuit 220 and current biasing circuit 230.

As mentioned above, resistors 223 and resistors 233 have a substantially equal resistance value. Therefore, since resistor 223 and resistor 233 have a substantially equal resistance value, and since these resistors have equal and opposite currents, the voltage across these resistors is also equal and opposite. In FIG. 2, these voltages are respectively designated as Vp (resistor 223) and Vn (resistor 233). Thus, Vn=−Vp.

Common mode voltage can be calculated in each leg of a drive circuit by the formula (Va+Vb)/2, wherein Va and Vb respectively equal the drive voltages in each leg of the drive circuit. Thus, in order to minimize common-mode voltage, the drive voltages and the resistances in each leg of the drive circuit have to be highly symmetrical. Under the arrangement in CM jump reduction circuit 200, Va and Vb can be replaced in the formula by Vp and Vn, the respective voltages across resistors 223 and 233. Using the equation for common-mode voltage, the common mode voltage is (Vp+Vn)/2=(Vp+−Vp)/2=0. Va and Vb are close to Vp and Vn, so the common mode voltage across the MR resistor will close to the common mode voltage of VpVn, which is zero.

Current biasing circuits 220 and 230 are used to drive the voltages on each side of MR head 225 to the voltages at resistors 223 and 233. In other words, the biasing circuits drive the voltage at each side of MR head 225 to equal the voltages at the respective resistor on that side. Therefore, since the voltages on each side of the MR head are driven to the voltages across resistors 223 and 233, the common-mode voltage across MR head 225 should be driven close to the same value as the common-mode voltage for resistors 223 and 233, which is zero. Accordingly, the common-mode voltage across MR head 225 is driven to zero.

Of course, other example embodiments are within the scope of the invention. For example, while the above-described circuit is effective in reducing common-mode voltages, transient common mode voltages may still occur when the current source is an AC current source, due to the transient delay in the current biasing circuit 220 being "charged" before current biasing circuit 230. One possible modification to address these transient common-mode voltages is to place a capacitor between NMOS transistor 221 and NMOS transistor 222 in current biasing circuit 220. This will provide a delay in "charging" biasing circuit 220 such that the transient currents may be reduced.

Figure 3A:
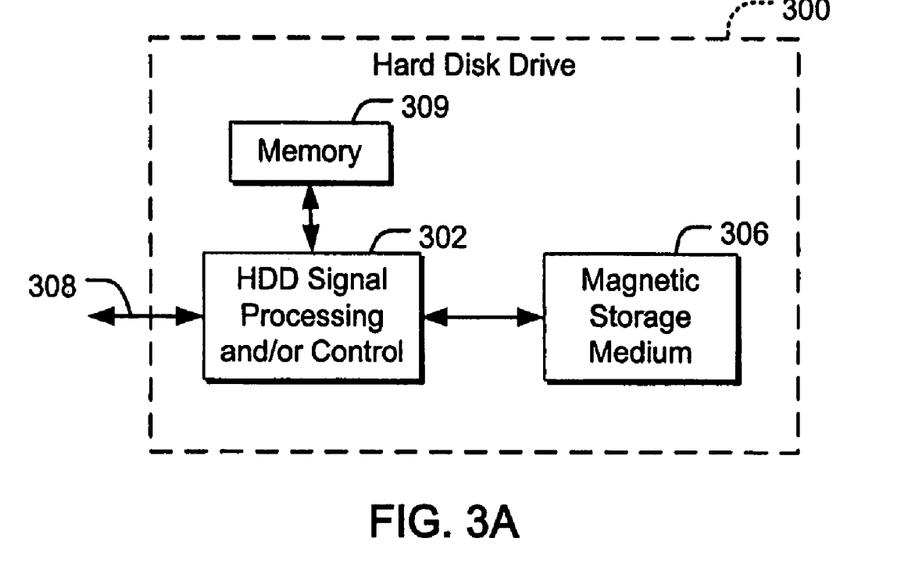
FIG. 3A is a block diagram showing an example embodiment of the invention in a hard disk drive.

Referring now to FIGS. 3A-3G, various exemplary implementations of the present invention are shown. Referring to FIG. 3A, the present invention may be embodied in a hard disk drive 300. The present invention may implement either or both signal processing and/or control circuits, which are generally identified in FIG. 3A at 302. In some implementations, signal processing and/or control circuit 302 and/or other circuits (not shown) in HDD 300 may process data, perform coding and/or encryption, perform calculations, and/or format data that is output to and/or received from a magnetic storage medium 306.

HDD 300 may communicate with a host device (not shown) such as a computer, mobile computing devices such as personal digital assistants, cellular phones, media or MP3 players and the like, and/or other devices via one or more wired or wireless communication links 308. HDD 300 may be connected to memory 309, such as random access memory (RAM), a low latency nonvolatile memory such as flash memory, read only memory (ROM) and/or other suitable electronic data storage.

Figure 3B:
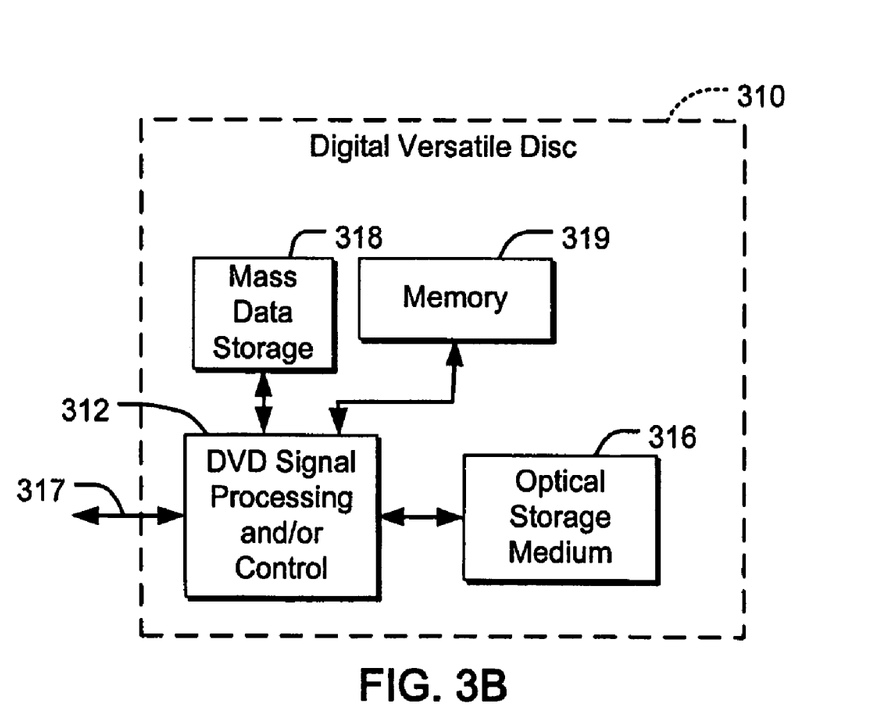
FIG. 3B is a block diagram of an example embodiment of the invention in a DVD drive.

Referring now to FIG. 3B, the present invention may be embodied in a digital versatile disc (DVD) drive 310. The present invention may implement either or both signal processing and/or control circuits, which are generally identified in FIG. 3B at 312, and/or mass data storage 318 of DVD drive 310. Signal processing and/or control circuit 312 and/or other circuits (not shown) in DVD 310 may process data, perform coding and/or encryption, perform calculations, and/or format data that is read from and/or data written to an optical storage medium 316. In some implementations, signal processing and/or control circuit 312 and/or other circuits (not shown) in DVD 310 can also perform other functions such as encoding and/or decoding and/or any other signal processing functions associated with a DVD drive.

DVD drive 310 may communicate with an output device (not shown) such as a computer, television or other device via one or more wired or wireless communication links 317. DVD 310 may communicate with mass data storage 318 that stores data in a nonvolatile manner. Mass data storage 318 may include a hard disk drive (HDD) such as that shown in FIG. 3A. The HDD may be a mini HDD that includes one or more platters having a diameter that is smaller than approximately 1.8". DVD 310 may be connected to memory 319, such as RAM, ROM, low latency nonvolatile memory such as flash memory, and/or other suitable electronic data storage.

Figure 3C:
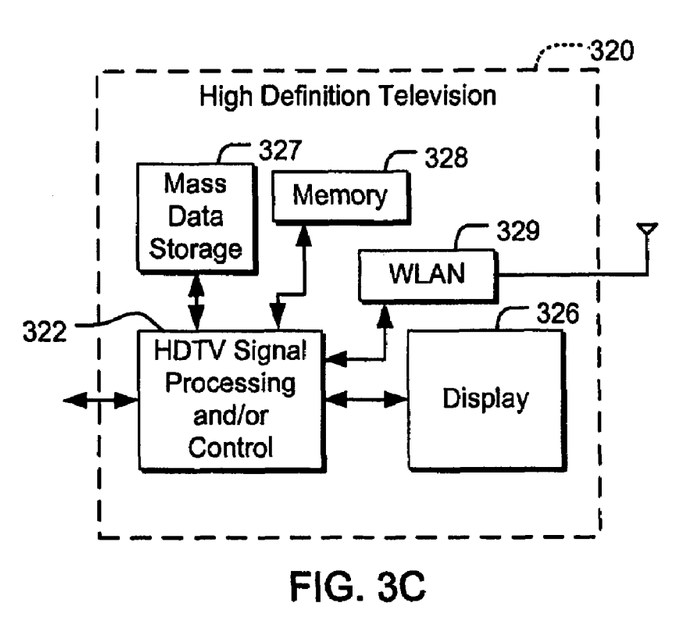
FIG. 3C is a block diagram of an example embodiment of the invention in a high definition television (HDTV).

Referring now to FIG. 3C, the present invention may be embodied in a high definition television (HDTV) 320. The present invention may implement either or both signal processing and/or control circuits, which are generally identified in FIG. 3C at 322, a WLAN interface and/or mass data storage of the HDTV 320. HDTV 320 receives HDTV input signals in either a wired or wireless format and generates HDTV output signals for a display 326. In some implementations, signal processing circuit and/or control circuit 322 and/or other circuits (not shown) of HDTV 320 may process data, perform coding and/or encryption, perform calculations, format data and/or perform any other type of HDTV processing that may be required.

HDTV 320 may communicate with mass data storage 327 that stores data in a nonvolatile manner such as optical and/or magnetic storage devices. At least one HDD may have the configuration shown in FIG. 3A and/or at least one DVD may have the configuration shown in FIG. 3B. The HDD may be a mini HDD that includes one or more platters having a diameter that is smaller than approximately 1.8". HDTV 320 may be connected to memory 328 such as RAM, ROM, low latency nonvolatile memory such as flash memory and/or other suitable electronic data storage. HDTV 320 also may support connections with a WLAN via a WLAN network interface 329.

Figure 3D:
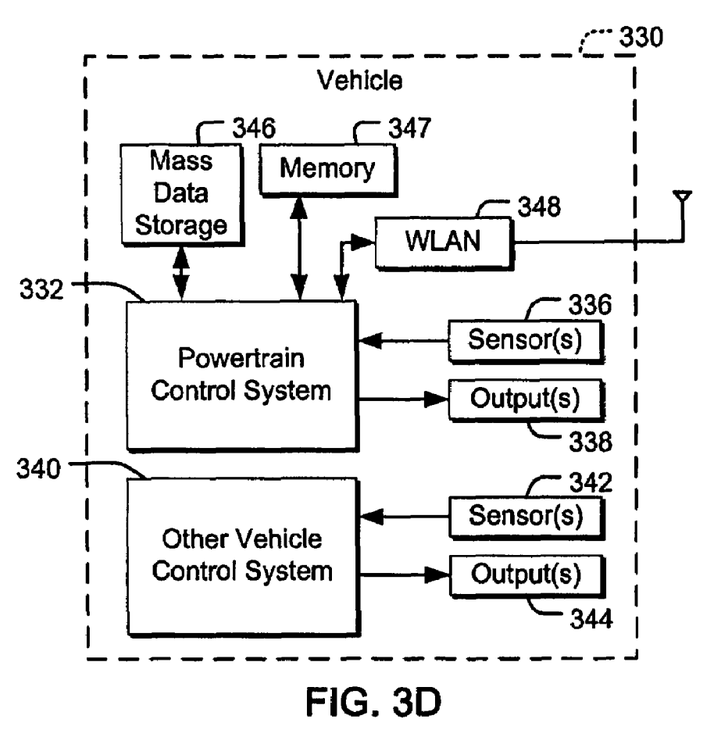
FIG. 3D is a block diagram of an example embodiment of the invention in a vehicle control system.

Referring now to FIG. 3D, the present invention implements a control system of a vehicle 330, a WLAN interface and/or mass data storage of the vehicle control system. In some implementations, the present invention implements a powertrain control system 332 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 340 of vehicle 330. Control system 340 may likewise receive signals from input sensors 342 and/or output control signals to one or more output devices 344. In some implementations, control system 340 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 332 may communicate with mass data storage 346 that stores data in a nonvolatile manner. Mass data storage 346 may include optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Powertrain control system 332 may be connected to memory 347 such as RAM, ROM, low latency nonvolatile memory such as flash memory and/or other suitable electronic data storage. Powertrain control system 332 also may support connections with a WLAN via a WLAN network interface 348. The control system 340 may also include mass data storage, memory and/or a WLAN interface (all not shown).

Figure 3E:
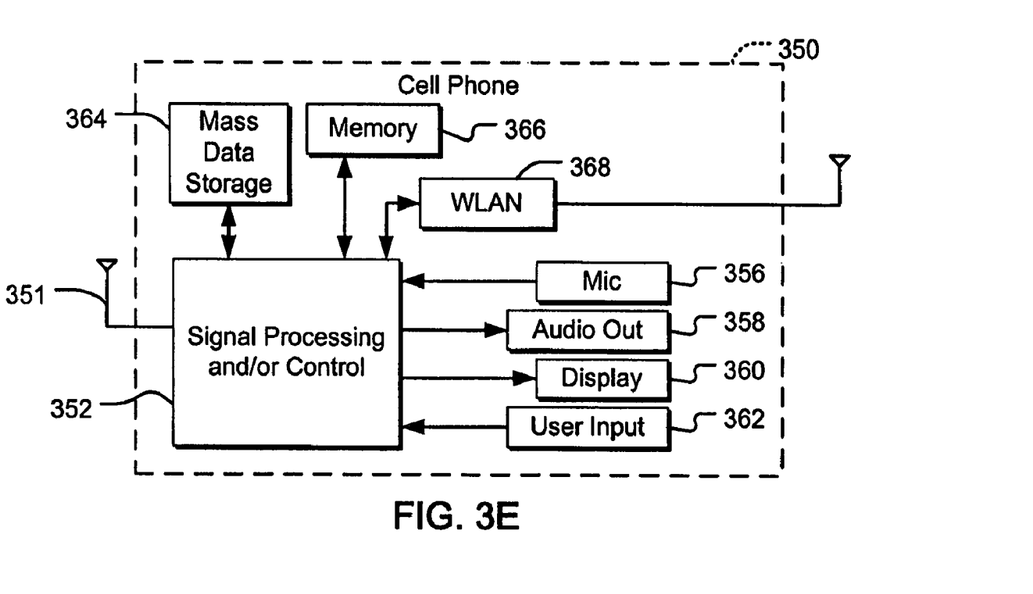
FIG. 3E is a block diagram of an example embodiment of the invention in a cellular or mobile phone.

Referring now to FIG. 3E, the present invention may be embodied in a cellular phone 350 that may include a cellular antenna 351. The present invention may implement either or both signal processing and/or control circuits, which are generally identified in FIG. 3E at 352, a WLAN interface and/or mass data storage of the cellular phone 350. In some implementations, cellular phone 350 includes a microphone 356, an audio output 358 such as a speaker and/or audio output jack, a display 360 and/or an input device 362 such as a keypad, pointing device, voice actuation and/or other input device. Signal processing and/or control circuits 352 and/or other circuits (not shown) in cellular phone 350 may process data, perform coding and/or encryption, perform calculations, format data and/or perform other cellular phone functions.

Cellular phone 350 may communicate with mass data storage 364 that stores data in a nonvolatile manner such as optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Cellular phone 350 may be connected to memory 366 such as RAM, ROM, low latency nonvolatile memory such as flash memory and/or other suitable electronic data storage. Cellular phone 350 also may support connections with a WLAN via a WLAN network interface 368.

Figure 3F:
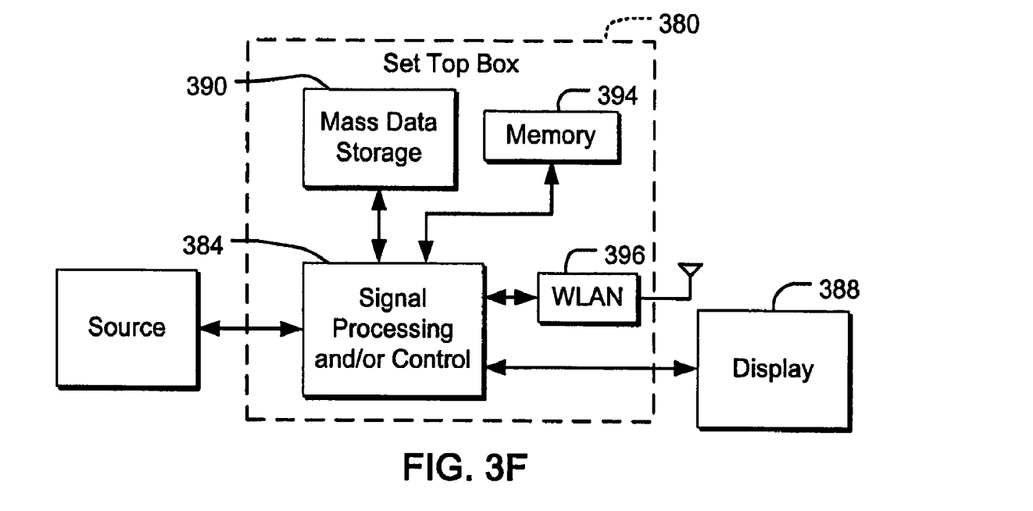
FIG. 3F is a block diagram of an example embodiment of the invention in a set-top box (STB).

Referring now to FIG. 3F, the present invention may be embodied in a set top box 380. The present invention may implement either or both signal processing and/or control circuits, which are generally identified in FIG. 3F at 384, a WLAN interface and/or mass data storage of the set top box 380. Set top box 380 receives signals from a source such as a broadband source and outputs standard and/or high definition audio/video signals suitable for a display 388 such as a television and/or monitor and/or other video and/or audio output devices. Signal processing and/or control circuits 384 and/or other circuits (not shown) of the set top box 380 may process data, perform coding and/or encryption, perform calculations, format data and/or perform any other set top box function.

Set top box 380 may communicate with mass data storage 390 that stores data in a nonvolatile manner. Mass data storage 390 may include optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Set top box 380 may be connected to memory 394 such as RAM, ROM, low latency nonvolatile memory such as flash memory and/or other suitable electronic data storage. Set top box 380 also may support connections with a WLAN via a WLAN network interface 396.

Figure 3G:
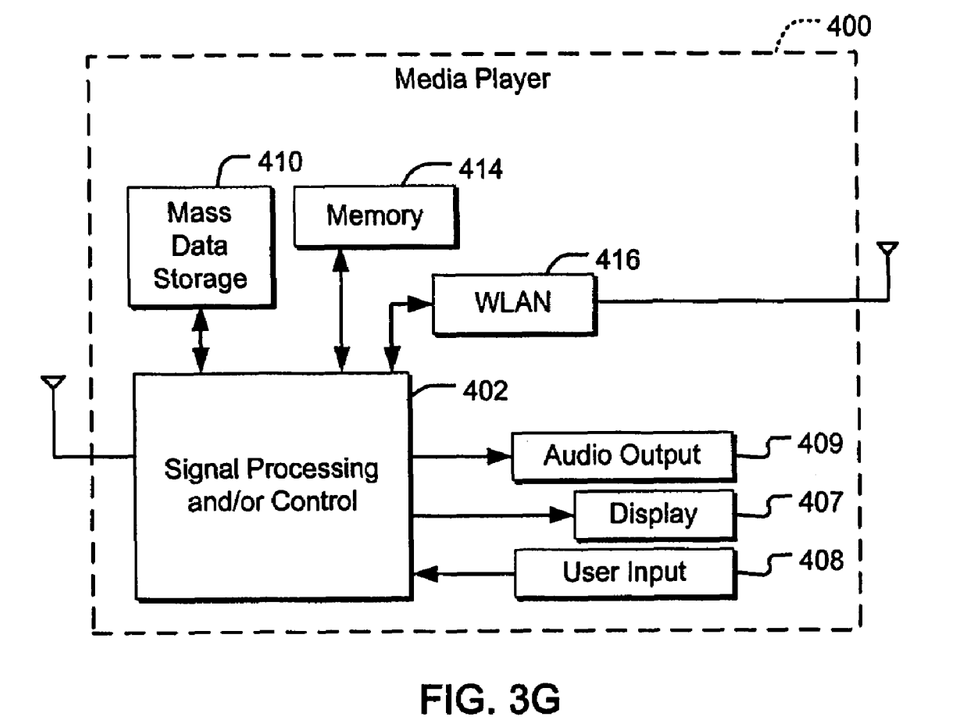
FIG. 3G is a block diagram of an example embodiment of the invention in a media player.

Referring now to FIG. 3G, the present invention may be embodied in a media player 400. The present invention may implement either or both signal processing and/or control circuits, which are generally identified in FIG. 3G at 402, a WLAN interface and/or mass data storage of the media player 400. In some implementations, media player 400 includes a display 407 and/or a user input 408 such as a keypad, touchpad and the like. In some implementations, media player 400 may employ a graphical user interface (GUI) that typically employs menus, drop down menus, icons and/or a point-and-click interface via display 407 and/or user input 408. Media player 400 further includes an audio output 409 such as a speaker and/or audio output jack. Signal processing and/or control circuits 402 and/or other circuits (not shown) of media player 400 may process data, perform coding and/or encryption, perform calculations, format data and/or perform any other media player function.

Media player 400 may communicate with mass data storage 410 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Media player 400 may be connected to memory 414 such as RAM, ROM, low latency nonvolatile memory such as flash memory and/or other suitable electronic data storage. Media player 400 also may support connections with a WLAN via a WLAN network interface 416. Still other implementations in addition to those described above are contemplated.

The invention has been described above with respect to particular illustrative example embodiments. It is understood that the invention is not limited to the above-described example embodiments and that various changes and modifications may be made by those skilled in the relevant art without departing from the spirit and scope of the invention.

What is claimed is:

1. A circuit for measuring the resistance of a magnetoresistive head coupled to a current source, comprising:
    first and second current biasing circuits respectively coupled to first and second opposite sides of the magnetoresistive head for biasing current through the magnetoresistive head, wherein said first current biasing circuit includes a first resistance and said second current biasing circuit includes a second resistance, and wherein the first and second resistances have values substantially identical to each other and are both coupled to ground;
    first and second current mirrors respectively coupled to the first and second current biasing circuits; and
    a current leg coupled to the first and second current mirrors;
    wherein the current mirrors drive current in the first and second resistances so that a first voltage across the first resistance is substantially equal and opposite to a second voltage across the second resistance; and
    wherein the first and second current biasing circuits bias current through the magnetoresistive head such that a voltage on the first side of the magnetoresistive head is substantially close to the first voltage and such that a voltage on the second side of the magnetoresistive head is substantially close to the second voltage.

2. The circuit according to claim 1, wherein the first current biasing circuit comprises two NMOS transistors.

3. The circuit according to claim 2, wherein the NMOS transistors of the first current biasing circuit are relatively large compared to other circuit elements.

4. The circuit according to claim 1, wherein the second current biasing circuit comprises two PMOS transistors.

5. The circuit according to claim 4, wherein the PMOS transistors of the second biasing circuit are relatively large compared to other circuit elements.

6. The circuit according to claim 1, wherein said first current mirror comprises a PMOS transistor, and wherein said second current mirror comprises an NMOS transistor.

7. The circuit according to claim 1, wherein said current leg comprises a voltage source, a PMOS transistor and an NMOS transistor.

8. The circuit according to claim 1, further comprising an analog-to-digital converter coupled to each side of the magnetoresistive head.

9. The circuit according to claim 1, further comprising a capacitance for delaying the flow of current through the circuit.

10. The circuit according to claim 9, wherein the capacitance is located between first and second NMOS transistors of the first current biasing circuit.

11. A method for measuring the resistance of a magnetoresistive head, comprising:

coupling first and second current biasing circuits respectively to first and second opposite sides of the magnetoresistive head for biasing current through the magnetoresistive head, wherein said first current biasing circuit includes a first resistance and said second current biasing circuit includes a second resistance, and wherein the first and second resistances have values substantially identical to each other and are both coupled to ground;

coupling first and second current mirroring circuits respectively to the first and second current biasing circuits; and coupling a current transfer circuit to the first and second current mirroring circuits;

driving current in the first and second resistances so that a first voltage across the first resistance is substantially equal and opposite to a second voltage across the second resistance, wherein the current is driven by said current mirroring circuits; and biasing current through the magnetoresistive head such that a voltage on the first side of the magnetoresistive head is substantially close to the first voltage and such that a voltage on the second side of the magnetoresistive head is substantially close to the second voltage, wherein the current is biased by said first and second current biasing circuits.

* * * * *